(12) United States Patent
Terpstra et al.

(10) Patent No.: US 9,497,228 B2
(45) Date of Patent: *Nov. 15, 2016

(54) CLASS 4 LONG DISTANCE SOFTSWITCH NETWORK WITH INTEGRATED CLASS 5 APPLICATION SERVICES

(71) Applicant: LEVEL 3 COMMUNICATIONS, LLC, Broomfield, CO (US)

(72) Inventors: Richard Dean Terpstra, Superior, CO (US); Gregory Anthony Gualtieri, Morrison, CO (US)

(73) Assignee: LEVEL 3 COMMUNICATIONS, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/817,159

(22) Filed: Aug. 3, 2015

(65) Prior Publication Data
US 2016/0028778 A1    Jan. 28, 2016

Related U.S. Application Data

(63) Continuation of application No. 13/644,987, filed on Oct. 4, 2012, now Pat. No. 9,100,503.

(51) Int. Cl.
*H04L 12/28* (2006.01)
*H04L 29/06* (2006.01)
*H04M 7/12* (2006.01)
*H04L 12/709* (2013.01)

(52) U.S. Cl.
CPC ....... *H04L 65/1026* (2013.01); *H04L 65/1006* (2013.01); *H04L 65/1033* (2013.01); *H04L 65/1046* (2013.01); *H04L 65/1053* (2013.01); *H04L 65/1063* (2013.01); *H04L 65/1069* (2013.01); *H04M 7/127* (2013.01); *H04L 45/245* (2013.01)

(58) Field of Classification Search
CPC .................................................. H04L 65/1046
See application file for complete search history.

(56) References Cited

U.S. PATENT DOCUMENTS

| | | | | |
|---|---|---|---|---|
| 7,477,734 B1 * | 1/2009 | Smith | ................... | H04M 7/128 370/352 |
| 7,529,269 B1 | 5/2009 | Bhat et al. | | |
| 7,720,049 B1 * | 5/2010 | Mikhailov | .......... | H04M 3/4217 370/352 |
| 8,085,787 B1 * | 12/2011 | Monteiro | ................ | H04L 12/66 370/238.1 |
| 2002/0114274 A1 * | 8/2002 | Sturges | ............... | H04L 12/5695 370/229 |
| 2002/0191590 A1 | 12/2002 | Niu et al. | | |

(Continued)

OTHER PUBLICATIONS

International Preliminary Report on Patentability, dated Apr. 7, 2015, Int'l Appl. No. PCT/US13/063410, Int'l Filing Date Oct. 4, 2013.

(Continued)

*Primary Examiner* — Chi H Pham
*Assistant Examiner* — Fahmida Chowdhury

(57) ABSTRACT

A telecommunication system including a class 4 long distance softswitch network with one or more a core routing engines and one or more class 5 application servers. The class 4 long distance softswitch network further includes at least one edge device, which may be in the form of a session border controller or media gateway, with at least one connection, including PRI, SS7 and TDM connections, to at least one customer premise equipment of at least one retail customer, which may be an enterprise customer. The class 5 application server is configured to provide the customer with class 5 services within the class 4 network.

11 Claims, 3 Drawing Sheets

(56) References Cited

U.S. PATENT DOCUMENTS

| | | | |
|---|---|---|---|
| 2007/0147358 A1* | 6/2007 | Mikleton | H04M 7/128 370/356 |
| 2007/0286082 A1* | 12/2007 | Hikspoors | H04L 45/10 370/238 |
| 2008/0025295 A1* | 1/2008 | Elliott | H04L 12/6418 370/356 |
| 2008/0192657 A1* | 8/2008 | Vagelos | H04M 3/42263 370/261 |
| 2012/0177195 A1 | 7/2012 | Illiott et al. | |
| 2014/0098945 A1 | 4/2014 | Terpstra et al. | |

OTHER PUBLICATIONS

International Search Report, dated Jan. 7, 2014, Int'l Appl. No. PCT/US13/063410, Int'l Filing Date Oct. 4, 2013.

Written Opinion of the International Searching Authority, dated Jan. 7, 2014, Int'l Appl. No. PCT/US13/063410, Int'l Filing Date Oct. 4, 2013; 6 pgs.

Extended European Search Report, dated May 6, 2016, Application No. 13844443.5, filed Oct. 4, 2013; 7 pgs.

* cited by examiner

CLASS 4 LONG DISTANCE SOFTSWITCH NETWORK WITH INTEGRATED CLASS 5 APPLICATION SERVICES

CROSS REFERENCE TO RELATED APPLICATIONS

This application is a continuation of and claims the benefit of priority to U.S. application Ser. No. 13/644,987 titled "CLASS 4 LONG DISTANCE SOFTSWITCH NETWORK WITH INTEGRATED CLASS 5 APPLICATION SERVICES," filed Oct. 4, 2012, which is hereby incorporated by reference herein.

TECHNICAL FIELD

Aspects of the present disclosure involve a telecommunication network, and more particularly a class 4 telecommunication network including a class 5 application server and a call routing engine that provide call services and class 5 features to retail enterprise customers directly within a class 4 network.

BACKGROUND

Telecommunications networks involve an exceedingly complex arrangement of highly technical components that almost magically allow people separated by vast distances to speak to each other. These networks have evolved from an analog system where a human operator was involved in completing a circuit between two rotary dial telephones to modern digital communications that use softswitch networks and voice over Internet Protocol (VoIP), among other technologies.

FIG. 1 is a diagram illustrating some of the components included in a conventional modern telecommunication network 10. Generally speaking, the telecommunication network includes a class 5 network 12 where various customers 14 connect to the network and it also includes a class 4 network 16 that handles long distance calling. The class 5 network may be an instance of a class 5 network, and there may be several instances of such class 5 networks (not shown) interconnected through the class 4 network. From a high level perspective, a person at a customer location initiates a call using a phone 18, directly from which may be a conventional phone, a VoIP phone, etc. Customer premise equipment 20, such as an integrated access device (IAD), an Internet Protocol Private Branch Exchange (IP-PBX) device, or the like routes the call to a geographically proximate class 5 telecommunications network using a trunk 22 between the customer and the class 5 network. In this example, the customer's are typically businesses or other organizations, rather than individual users, with a number of the organization's members having phones. An IP-PBX is a business telephone system that allows the organization to manage a number of different internal phone numbers and routes calls to the correct phone. The IP-PBX also facilitates connections of voice and data communications to a conventional public switched telephone network (PSTN), as well as data networks (as in the present example). An IAD, on the other hand, provides less sophisticated services compared to an IP-PBX while similarly allowing voice and data connections with data networks. Both devices allow for VoIP calls.

At an edge of the class 5 network, the call is received and processed by a session border controller (SBC) 24. At a high level, the SBC is involved in processing a VOIP call, along with a class 5 application server (e.g., a softswitch) 26, within the class 5 network. The class 5 network, which includes softswitch infrastructure, provides enterprise services and specifically session initiation protocol (SIP) trunking services. The term "SIP trunking services" refers to the use of VOIP and the SIP protocol to provide telecommunication services between a customer with an IP-PBX, IAD, or similar CPE, and the class 5 network. The class 5 application server provides several functions including call admission control (CAC), share concurrent call path (CCP) enforcement across all trunk groups (TGs) for a customer of the class 5 network, and class features such as call waiting, call forwarding, call transfer, etc. The class 5 network, in this example, initially receives and processes calls from retail customer. In contrast, the class 4 network 16, to which the class 5 network is connected at the SBC 24C, processes long distance calls. Hence, in a typical scenario, a call is first processed by and passes through a class 5 network and is handed to the class 4 network. From the class 4 network, the call proceeds to another destination 28 for termination. For example, the class 4 network 28A may be connected with a PSTN network that terminates the call. Thus, retail customers where a call originates or terminates are not directly connected to class 4 networks. In contrast, wholesale customers 30 that do not require any class 5 services connect directly to the class 4 network through the SBC 24C. Also, as shown on the left side of FIG. 1, a retail customer's PBX may interconnect directly to a class 4 network to receive long distance services and/or toll free services that do not require any class 5 features.

While highly functional, reliable and proven, the telecommunication network illustrated in FIG. 1 nonetheless may benefit form various improvements. The investment in building such networks is tremendous. However, as such networks are built and expanded, several redundancies and inefficiencies emerge. For example, to extend the geographic reach of the class 4 network, adjunct class 5 networks are built around the edges of the class 5 network. Similarly, to add customers to the class 5 networks, additional edges are built around the class 5 network to provide connections to customers. Thus, in essence, there are two complex and expensive steps required to process a call from a retail customer on a class 4 network. In another example, customers typically maintain their own CPE equipment that can provide much of the same features as a class 5 switch. It is with these issued in mind, among others that various features of the present disclosure were conceived.

SUMMARY

Aspects of the present disclosure involves a telecommunication system including a class 4 long distance softswitch network. The class 4 network involves a core routing engine and a class 5 application server. The class 4 long distance softswitch network further includes at least one edge device, such as an session border controller or a media gateway, with at least one direct connection (e.g., PRI, SS7, TDM) to at least one customer premise equipment of at least one retail customer. The class 5 application server is configured to provide the retail customer with class 5 services within the class 4 network.

Aspects of the present disclosure also involve a method for handling a call in a class 4 long distance softswitch network including the operations of receiving a call at an edge device (e.g., a session border controller or a media gateway) of a class 4 softswitch network. Next, the method includes the operation of querying a class 5 application server of the class 4 network to process the call according to class 5 services. Finally, the method involves forwarding the call to an egress point of the class 4 network.

DETAILED DESCRIPTION

Aspects of the present disclosure involve using a class 4 network as the aggregator and customer facing infrastructure for providing enterprise SIP (session initiation protocol) trunking services. Here, a class 4 long distance softswitch network includes one or more class 5 application servers. The class 4 network routes calls between an ingress point to the network, associated with the origin of the call, and an egress point from the network associated with the destination for the call. The class 5 application server provides class 5 services including call admission control (CAC), shared concurrent call path (CCP) enforcement across all trunk groups (TGs) for a customer, and class 5 features such as call waiting, call forwarding, call transfer, etc., for those calls requiring such services. Session border controllers and media gateways provide direct connections into the class 4 network for SIP/IP and TDM (including signaling system 7 (SS7), primary rate interface (PRI), circuit associated signaling (CAS) including multi-frequency (MF) and dual tone multi-frequency (DTMF) CAS) communications to and from the class 4 network. Retail customers, such as enterprises, thus, may connect with the class 4 network like wholesale customers rather than first being processed by an adjunct class 5 network. Wholesale customers, such as other telecommunication providers, that do not use class 5 services may connect with the network to carry long distance calls, and retail customers, such as enterprise customers, may also connect to the class 4 network and be provided class 5 services, while handlers connect their calls.

Figure 1:
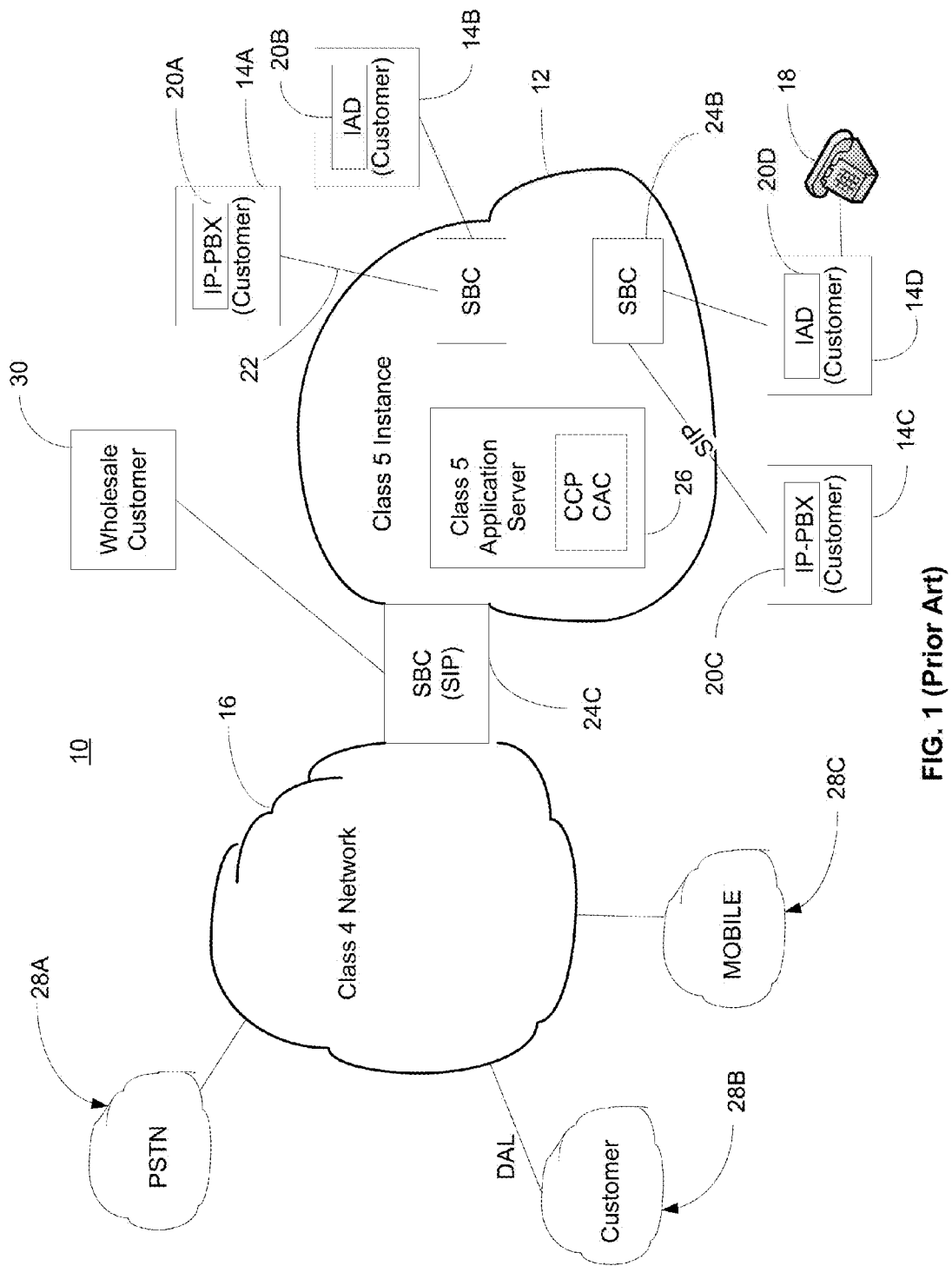
FIG. 1 (prior art) is a diagram of a conventional telecommunication system having a class 4 network and one or more adjunct and distinct class 5 networks that provide class 5 services to various customers, such as enterprises and other retail customers.
Figure 2:
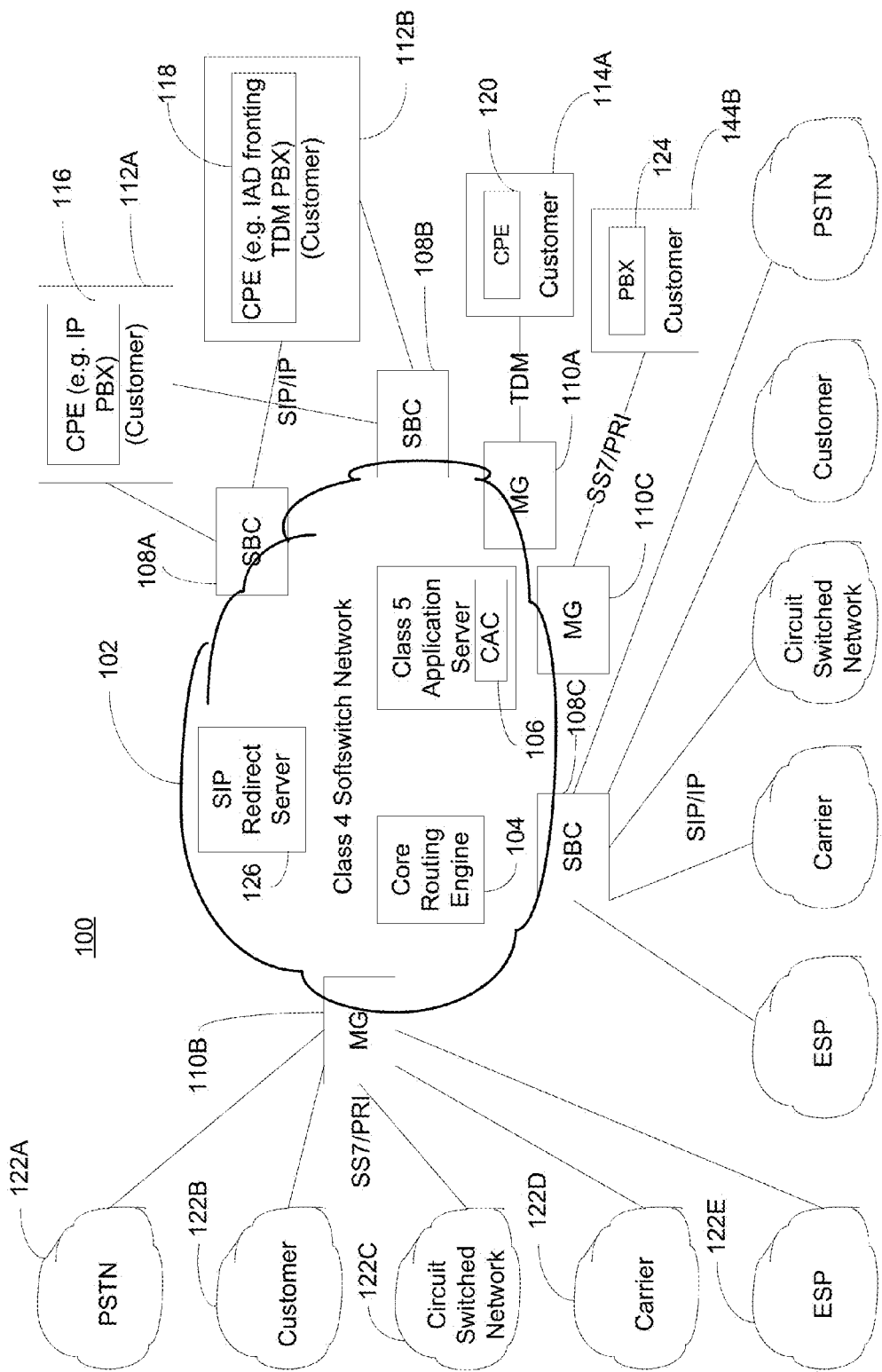
FIG. 2 is a diagram of a telecommunication system conforming to aspects of the present disclosure, the telecommunication system including a class 4 long distance softswitch network including a core routing engine and class 5 application server configured to provide class 5 services directly to customer, such as enterprise customers, among other functions and advantages.

FIG. 2 illustrates one example of a telecommunication network architecture 100 conforming to aspects of the present disclosure. At its core, the telecommunications network includes a class 4 long distance softswitch network 102. The softswitch network includes numerous computing, networking, optical and physical components and may physically stretch across a vast geographic region. For example, the softswitch network may include components capable of transmitting calls across North America. Due to the overwhelming complexity of the network many of the components are not illustrated for purposes of not obscuring and unnecessarily overcomplicating this description. Illustrated, however, is a core routing engine (CRE) 104 and a class 5 application server 106. Hence, rather than providing a class 5 application server in an adjunct class 5 network as shown in FIG. 1, the class 5 application server is within the class 4 softswitch network. As will be discussed herein, this provides several advantages including removing unnecessary redundancies, reducing cost, and improving the scalability of the network.

The core routing engine is a unified routing engine that makes call routing decisions and maintains and enforces policies for the softswitch network. When a call arrives at an SBC 108, the CRE 104 is queried and it provides instructions 110 to the SBC as to which egress device (e.g. an SBC or media gateway (MG)) where to send the call for terminating outside the class 4 network (e.g. a PSTN or customer). Additionally, the CRE may implement least cost routing. One specific example of a CRE that may be deployed in a telecommunication network conforming to aspects of the present disclosure is a centralized routing and policy server, such as a service control point (SCP) that advanced intelligent networks (AIN) use for least cost routing.

Along the edge of the softswitch network, any number of session border controllers and media gateways provide interconnection points to the class 4 softswitch network. An SBC typically provides for SIP connections with customers 112 whereas a media gateway typically provides SS7 or PRI connections with customers 114.

For example, customer premise equipment in the form of an IP-PBX 116 is connected to a first session border controller 108A and handles calls using SIP messaging. Similarly, customer premise equipment, in the form of a IAD fronting a TDM PBX 118 is connected to a second session border controller 108B also using SIP messaging. Session border controllers are ubiquitous across the network and facilitate interconnections with emergency service providers (ESP), carriers, circuit switched networks, customers, and PSTNs, among others. Conceptually, the collection of SBC's is an edge of the class 4 softswitch network.

In one specific implementation, the SBC may be in the specific form of an Internet Protocol media gateway (IP MG). The IP MG provides SBC functionality and further provides transcoding capability and IP trunk grouping (TG) entities. Unlike some conventional designs, the network architecture of FIG. 2 provides redundant connections to the customers. Hence, as shown in FIG. 2, the IP-PBX 116 also includes a second redundant connection with the second session border controller 108B, and similarly the IAD 118 includes a second redundant connection with the first session border controller. Thus, if one of the connections fails, the customer will maintain service by using the redundant connection.

In this architecture, a customer interfaces with one of the SBC's of the class 4 softswitch network. Therefore, if a customer does not require any digital signal processing (DSP) resources, then its IP TG can be configured as such. In a conventional customer enterprise environment where there is an IAD fronting a PBX, this may not be common, but does offer the possibility for efficient use of DSP capacity management. The architecture also provide the ability for a customer to interface with TDM from a PBX 120 directly to the class 4 softswitch network but still get many of the features through the class 5 application server they would have with a PBX at their premise. By adding the TDM access, a customer can transition from TDM to SIP/IP and keep the same services. TDM interconnect also provides a means to migrate customers from a legacy class 5 circuit switch to the described system.

As shown in FIG. 2, media gateways 110 may be positioned around the edge of the class 4 long distance softswitch network. One advantage of the depicted network architecture is the provision of SS7 and PRI communications with a PSTN 122A, customers 122B, circuit switched networks 122C, carriers 122D, emergency service providers 122E, and others, using a media gateway. PRI is a telecommunications service level for carrying voice and data transmissions between a network and a user. PRI is typically used by enterprises with digital PBXs to provide them digital access to the PSTN. SS7 is a set of telephony signaling protocols which are used to set up most of the world's public switched telephone network telephone calls. In North America, SS7 uses ANSI ISUP as the signaling variant. PRI and SS7 are conventional technologies used by many enterprises that have not migrated or otherwise employed communication systems using SIP. In these instances, the enterprise's PBX 124 or CPE has a PRI connection. In a conventional network as depicted in FIG. 1, should the enterprise desire class 5 services using such a conventional PRI connection it is difficult and cost prohibitive to add a media gateway to the class 5 network. With the architecture depicted in FIG. 2, the media gateway provides the enterprise or other customer with a PRI connection to connect with the class 4 network and the desired class 5 services are directly provided by the class 5 application server 106 within the class 4 softswitch network 102.

Concurrent call path (CCP) is a concept that generally addresses oversubscription to a VOIP network. One component of CCP involves limiting the number of calls to a prespecified number. So, for example, an enterprise customer 112 (e.g., a large business, governmental organization, university, etc.) of a telecommunications provider may have 2000 total phones across a geographically dispersed organization. The customer, however, may only use, at most, 200 concurrent call paths. Thus, that customer may have two thousand telephone numbers (TN's) but only may order 200 concurrent call paths from the telecommunication provider to support the customer's peak usage. In some cases, call admission control (CAC) is used to limit that customer to the subscribed 200 sessions. Conventionally, CCP-based CAC is performed on the edge of the adjunct class 5 network illustrated in FIG. 1. However, since conventional class 5 networks and class 5 softswitches are geographically focused, a given conventional class 5 switch may only have limited visibility of the customer's calls thereby making CAC across several class 5 networks difficult. For example, the customer may be using 150 concurrent call paths in one class 5 network and 150 concurrent call paths in another class 5 network but each of the networks would only be aware of the 150 concurrent call paths and not aware that the customer has exceeded the subscription by 100 calls (300 total−200 subscribed=100 over subscription). In the present architecture, the class 5 softswitch within the class 4 network may provide national or international call admission control. Stated differently, the class 5 softswitch may track all of a customer's calls and conduct call admission control across the full geographic scope of the network thereby eliminating the need for separate CCP CAC devices.

In the present architecture, the SIP trunks between an SBC 18 and a customer 112 may be sized to handle the TN's at the customer premise by way of an oversubscription model, meaning there is not one CCP per TN, but usually one CCP per five TN's (or some other number of TN's greater than one). For relatively small locations, such as a location with only five phones, the oversubscription model may use a 2:1 or 3:1 model. Referring again, for example, to the customer with two thousand telephone numbers, if that customer has 200 discrete locations with 3-5 TN's at each location, then 200 SIP trunks are turned-up and sized to each handle 3-5 active telephones at each location. Thus, the network is configured to support a capacity of 600-1000 sessions for the customer. For redundancy, additional trunks, such as two trunks for each location, may also be turned-up. Unlike a conventional network, however, the edge is not configured to manage the call volume. Rather, CCP limits (e.g., 200 active sessions) may be enforced within the class 4 softswitch network by the class 5 application server. The network edge still has a "physical" limit of simultaneous calls it will handle, but the aggregate across all TG will usually be greater than the shared CCP limit. For instance, the customer might have eight (8) total TG's (could include redundant TG to each CPE) with each TG being 100 sessions, but the shared CCP could be only 200 instead of 800.

Conventionally, it is difficult to provide TG redundancy to a CPE on a circuit switch because there is usually just one circuit switch to which the CPE can connect in a given geographic area. To obtain redundancy, methods such as remote call forwarding to a second number on a redundant circuit switch are used. In the present case, these limitations do not exist because the "switch" is in the core of the network and any edge can reach the switch. In specific reference to the conventional architecture shown in FIG. 1, this architecture can provide for redundancy of an IP TG but not for TDM (doesn't exist). In contrast, referring to FIG. 2, a customer can get redundancy for both IP and TDM interconnects. In fact, a customer can use TDM as backup for IP and vice versa.

Generally speaking, the class 5 switch handles calls into the class 4 network from enterprise customers whereas the CRE handles other calls, such as from wholesale customers, into the class 4 network since a wholesale customer, such as a telecommunication provider, does not require any class 5 services. Regardless, the CRE first processes the call to determine whether it is from a class 5 softswitch customer. If the call is from a class 5 softswitch customer, then the CRE hands control of the call to the class 5 application server. A call from a wholesale customer, on the other hand, is processed by the CRE and does not require processing by the application server.

In general, all calls destined to an telephone number associated with the class 4 network will go through the class 4 network to the class 5 application server and then to a customer. All calls from a known telephone number associated with the class 4 network will go through an SBC (e.g., an IP MG), to the class 5 application server, and then out to called destination.

Figure 3:
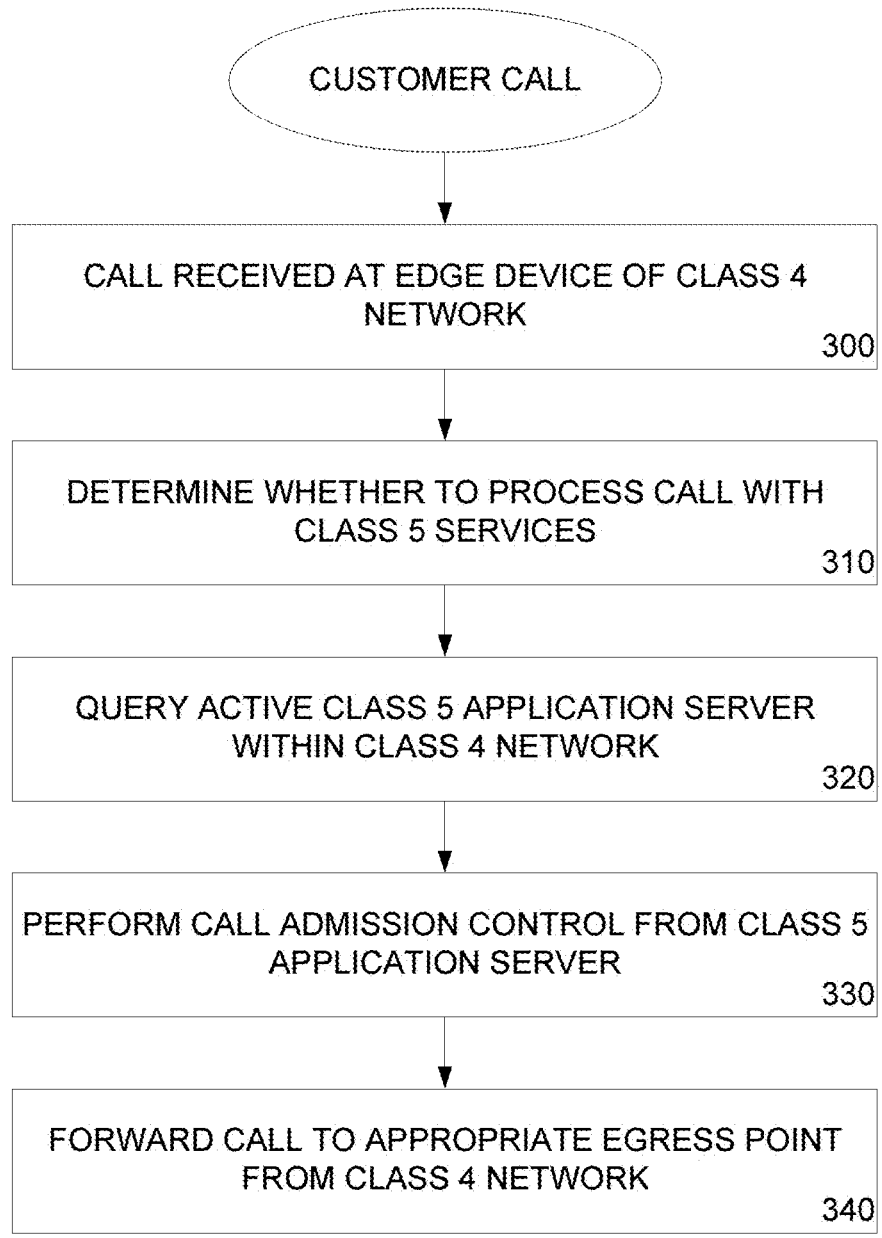
FIG. 3 is a flowchart illustrating one method of processing a call using the telecommunication system of FIG. 2.

Referring now to FIG. 3, one method of processing calls using the network of FIG. 2 is shown. To begin, an edge device of the class 4 network receives a call (operation 300). For calls coming from the customer, the customer's CPE will send the call to a class 4 edge device (e.g., an MG or an SBC).

It is then determined whether the call requires or otherwise implicates class 5 services (operation 310). In some instances, the edge device may first query and otherwise use the CRE to determine that the call needs to go to the Class 5 application server. In other instances, the edge device itself may contain information that calls from a specific TG need to go to the class 5 application server. Here, the edge device will recognize the origin of the call and include information at or directly accessible by the edge device that the call involves class 5 services.

When class 5 services are implicated, the appropriate class 5 application server is queried (operation 320). In some instances, the network may operate multiple active/standby pairs of class 5 application servers. When the network operates such pairs, then one method of accessing the active class 5 application server is to first query a SIP redirect server that has the status of each active class 5 server for the TN making the call. The application server is configured to perform call admission control, when necessary (operation 330). More specifically, once the call reaches the proper class 5 application server, it will perform outgoing call admission control to verify that the TN has the proper configuration to allow the type of outbound call the TN is requesting (e.g. an international call). Following CAC, the call is routed to the appropriate egress point to complete or otherwise forward the call (operation 340).

More specifically, if the application server allows the call, it will next check to see if the dialed TN exists on the application server, meaning the application server has sufficient information to determine where to route the call. If so, the application server will perform incoming call admission control for the dialed TN. If CAC passes, the application server will find one or more TG's that can service the TN and send the call to an ordered list of TG's until the call connects, the end point rejects the call, or the application server exhausts the ordered list of TG's (attempts to complete the call using each of the TG's in the list but each TG fails to complete the call).

If the application server does not know about the dialed TN, it may query a SIP redirect server or other type of registry to discover if the dialed TN exists on another class 5 application server. If the dialed TN does exist on another (second) application server, the first application server will send the call to the second application server, where the second application server will then perform incoming CAC on the dialed TN. For the case where the TN does not exist on any class 5 application server, the SIP redirect server, if used, will redirect the call to the CRE. In such a situation, the application server will query the CRE, and the CRE will return an ordered list of route choices to the AS for how to get the call out of the Class 4 network. The route choices could be to a class 4 customer or to a PSTN, among others.

For calls destined to a customer, an ingress gateway will query the CRE for routes. The CRE will redirect the ingress gateway to the redirect server that will redirect the ingress gateway to the appropriate application server. Stated differently, the ingress gateway will send the call to redirect sever that will redirect the call to the application server based on the dialed telephone number. The application servers will perform any screening or apply any features, such as call forwarding, to the call. The application server will then send the call to the customer on the trunk group of the appropriate egress SBC (e.g., IP MG). The egress SBC may apply formatting rules or other trunk group attributes to the call before sending the call to the customer.

There may be instances when calls from a class 5 customer are received by the network but do not leave the network. For example, calls may not leave the network when a class 5 customer calls into an internal conference service. There are also instances when a caller is accessing a voicemail platform within the network, such as when a PSTN caller is redirected to voicemail or a class 5 customer is retrieving voicemail. In these instances, the call terminates in the network.

The illustrated architecture provides a scalable solution by allowing each application server to act independently from each other and letting the redirect server or CRE to direct calls to the appropriate class 5 application server. More efficient capacity management of the SBC is possible in this architecture because there may be customers who do not require DSP resources on the SBC. This is a result of each customer having their own trunk group with CODEC settings as compared to the conventional model of a shared IP TG. The architecture also allows for TDM access whereas the conventional architecture does not.

As discussed herein embodiments of the present disclosure include various steps or operations which maybe performed by hardware components, software components or, in alternative embodiment, hardware components may be used in combination with the software instructions. Accordingly, aspects of the present disclosure may involve a computing device or system with at least one processor, a system interface, a memory, a storage device and at least one I/O device. The system may further includes a processor bus and an input/output (I/O) bus. These and other features may or may not be included in a particular computing system, may be rearranged, and the like.

The memory typically includes one or more memory cards and control circuit, and may further include a main memory and a read only memory (ROM). According to one embodiment, the above methods may be performed by the computer system in response to the processor executing one or more sequences of one or more instructions contained in the main memory. These instructions may be read into main memory from another machine-readable medium capable of storing or transmitting information in a form (e.g., software, processing application) readable by a machine (e.g., a computer). Execution of the sequences of instructions contained in main memory may cause the processor to perform the process steps described herein.

A machine-readable media may take the form of, but is not limited to, non-volatile media and volatile media. Non-volatile media may include a mass storage device and volatile media may include dynamic storage devices. Common forms of machine-readable medium may include, but is not limited to, magnetic storage medium (e.g. floppy diskette); optical storage medium (e.g. CD-ROM), magneto-optical storage medium; read only memory (ROM); random access memory (RAM); erasable programmable memory (e.g., EPROM and EEPROM); flash memory; or other types of medium suitable for storing computer instructions.

Embodiments of the present disclosure include various steps, which are described in this specification. As discussed above, the steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

While the present disclosure has been described with reference to various embodiments, it will be understood that these embodiments are illustrative and that the scope of the disclosure is not limited to them. Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternative, modifications, and variations together with all equivalents thereof.

The invention claimed is:

1. A telecommunication system comprising:
   a class 4 long distance softswitch network comprising a core routing engine and a class 5 application server, the class 4 long distance softswitch network further comprising at least one edge device with at least one direct connection to at least one customer premise equipment of at least one retail customer, the class 5 application server configured to provide the retail customer with class 5 services within the class 4 network, and the core routing engine configured to determine whether to process a call with class 5 services.

2. The telecommunication system of claim 1 wherein the class 4 network provides enterprise session initiation protocol trunking services.

3. The telecommunication system of claim 1 wherein the class 5 application server is configured to perform call admission control.

4. The telecommunication system of claim 1 wherein the at least one edge device includes at least one session border controller and at least one media gateway.

5. The telecommunication system of claim 4 wherein the at least one direct connection includes a first direction connection between the at least one session border controller providing session initiation protocol messaging services for a first enterprise retail customer of the at least one retail customer.

6. The telecommunication system of claim 5 wherein the at least one direct connection includes a second direction connection between the at least one media gateway providing signaling system 7 or primary rate interface connections for a second enterprise retail customer of the at least one retail customer.

7. The telecommunication system of claim 6 wherein the second enterprise retail customer has a redundant connection to the at least one session border controller, and the first enterprise retail customer has a redundant connection to the at least one media gateway.

8. The telecommunication system of claim 1 wherein:
the at least one edge device comprises a first edge device and a second edge device;
the at least one direct connection includes a first direct connection between the first edge device and a first customer premise equipment of a first enterprise retail customer;
the at least one direct connection includes a second direct connection between the second edge device and a second customer premise equipment of a second enterprise retail customer;
a first redundant direct connection between the first edge device and the second customer premise equipment; and
a second redundant connection between the second edge device and the first customer premise equipment.

9. The telecommunication system of claim 8 wherein the first edge device and the second edge device are selected from a session border controller and a media gateway and the first customer premise equipment and the second customer premise equipment are selected from a PBX, an IP PBX, and an IAD.

10. The telecommunication system of claim 1 wherein the at least one direct connection is a time division multiplexing (TDM) connection, and the at least one customer premise equipment is a PBX.

11. The telecommunication system of claim 1 wherein the at least one edge device is a media gateway and the at least one direct connection is a primary rate interface (PRI) connection, the class 5 application server providing class 5 services to the at least one retail customer.

* * * * *